(12) United States Patent
Noble

(10) Patent No.: US 8,930,703 B2
(45) Date of Patent: Jan. 6, 2015

(54) METHODS, SYSTEMS AND COMPUTER PROGRAM PRODUCTS FOR CONTROLLING THE DISCLOSURE TIME OF INFORMATION

(75) Inventor: Gary Paul Noble, Worcestershire (GB)

(73) Assignee: International Business Machines Corporation, Armonk, NY (US)

( * ) Notice: Subject to any disclaimer, the term of this patent is extended or adjusted under 35 U.S.C. 154(b) by 2892 days.

(21) Appl. No.: 10/558,942

(22) PCT Filed: May 25, 2004

(86) PCT No.: PCT/EP2004/050847
§ 371 (c)(1),
(2), (4) Date: Aug. 21, 2006

(87) PCT Pub. No.: WO2004/114197
PCT Pub. Date: Dec. 29, 2004

(65) Prior Publication Data
US 2007/0038862 A1  Feb. 15, 2007

(30) Foreign Application Priority Data

Jun. 4, 2003 (GB) .................................. 0312736.2

(51) Int. Cl.
| | |
|---|---|
| H04L 29/06 | (2006.01) |
| H04N 21/266 | (2011.01) |
| H04N 21/254 | (2011.01) |
| G06F 21/72 | (2013.01) |
| H04N 21/2347 | (2011.01) |
| H04N 21/4405 | (2011.01) |
| H04N 21/433 | (2011.01) |
| H04N 21/6334 | (2011.01) |
| G06F 21/62 | (2013.01) |

(52) U.S. Cl.
CPC ...... *H04L 63/0428* (2013.01); *H04N 21/26613* (2013.01); *H04N 21/2541* (2013.01); *G06F 21/725* (2013.01); *H04L 63/0846* (2013.01); *H04L 63/068* (2013.01); *H04N 21/2347* (2013.01); *H04N 21/4405* (2013.01); *H04N 21/4331* (2013.01); *H04N 21/63345* (2013.01); *G06F 21/6209* (2013.01)
USPC ........... 713/175; 713/165; 713/176; 713/178; 726/27; 380/281; 380/282

(58) Field of Classification Search
USPC .................... 713/175, 176, 178, 165; 726/27; 380/281, 282
See application file for complete search history.

(56) References Cited

U.S. PATENT DOCUMENTS

| | | | |
|---|---|---|---|
| 5,535,276 A | 7/1996 | Ganesan | |
| 5,991,399 A * | 11/1999 | Graunke et al. | 380/279 |

(Continued)

FOREIGN PATENT DOCUMENTS

WO  WO 2004/114197  5/2001

OTHER PUBLICATIONS

Schneier, Bruce. Applied Cryptography, 1996. John Wiley & Sons, 2nd edition. pp. 37-38, 185-187.*

(Continued)

*Primary Examiner* — Christopher Revak
*Assistant Examiner* — Sarah Su
(74) *Attorney, Agent, or Firm* — Russell Ng PLLC; Ronald Kaschak

(57) ABSTRACT

Methods, systems and computer program products are provided for controlling the disclosure time of information by a publisher to one or more recipients. A trusted body generates an asymmetrical key pair for a specified date and time of disclosure with an encryption key and a decryption key. The trusted body provides a digital certificate signed with a private key of the trusted body providing the publisher with the encryption key prior to the specified date and time. The publisher uses the encryption key to encrypt data and a recipient obtains the encrypted data at any time prior to the specified date and time. The trusted body then makes the decryption key available to the recipient at or after the specified date and time.

18 Claims, 6 Drawing Sheets

(56) References Cited

U.S. PATENT DOCUMENTS

| | | | |
|---|---|---|---|
| 6,603,857 B1* | 8/2003 | Batten-Carew et al. | 380/44 |
| 6,742,119 B1* | 5/2004 | Peyravian et al. | 713/178 |
| 6,813,358 B1* | 11/2004 | Di Crescenzo et al. | 380/280 |
| 2001/0052071 A1* | 12/2001 | Kudo et al. | 713/156 |
| 2002/0097878 A1* | 7/2002 | Ito et al. | 380/277 |
| 2003/0198348 A1* | 10/2003 | Mont et al. | 380/277 |
| 2009/0259593 A1* | 10/2009 | Murashita et al. | 705/76 |

OTHER PUBLICATIONS

International Search Report and Written Opinion corresponding to PCT/EP2004/050847, mailed Nov. 15, 2004.

International Preliminary Report on Patentability corresponding to PCT/EP2004/050847, mailed Aug. 2, 2005.

Choudhury, A.K. et al., "Copyright Protection for Electronic Publishing Over Computer Networks," IEEE Network, IEEE Inc. New York, US, vol. 9, No. 3, May 1, 1995, p. 12-20.

Menezes, Oorschot, Vanstone, "Handbook of Applied Cryptography," *Handbook of Applied Cryptography*, CRC Press Series on Discrete Mathematics and Its Applications, 1997, p. 548, 549, 552, 557-581.

Mont et al., The HP Time Vault Service: Exploiting IBE for Timed Release of Confidential Information, WWW 2003, May 20-24, 2003, Budapest, Hungary.

* cited by examiner

METHODS, SYSTEMS AND COMPUTER PROGRAM PRODUCTS FOR CONTROLLING THE DISCLOSURE TIME OF INFORMATION

RELATED APPLICATIONS

The present application is a 35 U.S.C. §371 national phase application of PCT International Application No. PCT/EP2004/050847, having an international filing date of May 25, 2004, and claiming priority to European Patent Application No. 0312736.2, filed Jun. 4, 2003, the disclosures of which are incorporated herein by reference in their entireties. The above PCT International Application was published in the English language and has International Publication No. WO 2004/114197 A1.

FIELD OF THE INVENTION

This invention relates to the field of supply of information. In particular, this invention relates to controlling the disclosure time of information.

BACKGROUND OF THE INVENTION

Over recent years, there has been a huge increase in the volume of information published and distributed electronically.

The advent of the Internet and communication via e-mail means that information can be obtained and downloaded directly to an electronic device such as a computer or a mobile phone via communication means such as telephone networks. A high volume of information can be distributed quickly as long as there is available bandwidth capacity in the communication means.

Information can also be stored electronically on a storage medium such as a diskette or a CD-ROM and the storage medium can be distributed. A high volume of information can be transferred on a relatively small storage device.

In this way electronic devices operate to receive information both in a connected and a disconnected environment. The received information can then be stored on the electronic device itself for as long as the user requires the information. The term information is used to encompass all types of data including as examples the following: documents; visual data such as still or moving images; audio data such as music, voice, etc.

Problems are faced when distributing information using electronic means wherein the information is only made available at a specific time. All the people wanting the information will instantly try to download the data from the same source all at the same time. This can lead to overstretching of resources and subsequent delays. Also, offline users cannot access the information as quickly as connected users as they must wait for the information to be received on a storage device which must be physically transferred.

A distinction can be made between the distribution of information and the ability to access the information. For example, information may be sent electronically to a recipient as encrypted data The information in the encrypted data can only be accessed by the recipient with a key such as a password to unlock the encrypted data. The time of access to the information can be governed by the issue of the key to the recipient.

Controlling the time of the disclosure of information is important for time sensitive material. For example, company accounts, results, reports and announcements may need to be disclosed after a certain time. Such documents may be large and distribution by electronic means may be economical and practical compared to more traditional means of distribution such as printed documents.

Cinema film distribution is another area in which the timed disclosure of information would be beneficial. Currently a film for release is distributed on the release date via satellite communication. It would be beneficial to be able to send the encrypted film via a public IP network at any time prior to the release date so that advantage could be taken of downtime in the network communications avoiding congestion and delays.

Another business problem associated with the time of disclosure of information arises if a party wishes to provide proof to others that they knew of something before the event, but could not disclose it immediately without business loss. Information could be sent in an encrypted form and disclosed at a later date. Proof is then provided that the sender had the information at a time before the disclosure time.

SUMMARY OF THE INVENTION

The aim of the present invention is to provide a method and system for controlling the disclosure time of information. Information can be distributed and stored by a recipient prior to disclosure to the recipient. The invention makes use of public key cryptography.

The following is a brief summary of public key cryptography. Public key cryptography uses a pair of asymmetric related keys, one for encryption and the other for decryption.

In normal use, one of the key pair (the private key) is kept secret by the user, while the other key (the public key) can be publicly disclosed. The key pair must have the property that, given knowledge of the public key, it is infeasible to determine the private key.

A user receives or, with suitable hardware or software, can generate for itself a pair of keys which are generally two large numbers. In normal use, the user keeps one of these keys private and never discloses it. The other key can safely be made public, just like a phone number or similar personal data Public keys do not have to be published to the world. They can be shared as widely or narrowly as business and privacy requirements dictate.

Due to the way the keys are generated, information encrypted with the private key can only be decrypted with the public key and vice versa. Using a key pair means that the sender and receiver do not need to share a secret key.

The term "user" is defined as any entity including individuals, groups of individuals, one or more individuals in a role, corporations, organisations, computer applications or systems, automated machines, etc.

Conventional use of public key cryptography makes the following possible:

Anyone knowing a users public key can send the user a message encrypted with that key and can be sure that only the user—who alone has the corresponding private key—can decrypt it This provides confidentiality.

A user might also encrypt a message with his private key. This cannot provide confidentiality, because anyone who knows the corresponding public key can decrypt it The fact that they can decrypt it means the message must have come from the user—who alone has the private key. This provides authentication and can also be used as a basis for non-repudiation—the digital equivalent of a signature.

If a sender signs a message with his own private key and then encrypts it with the recipients public key, confidentiality, authentication and non-repudiation are provided together.

In a public key infrastructure, the user typically needs a certificate for his public key. This certificate tells those the user deals with that the public key really does identify the user. The public key certificate is issued by a reputable, trusted agency, such as a bank.

A problem arises if the user is dealing with a business associate who does not know the bank issuing the certificate certifying the public key of the user. The bank itself can have a public key certificate, issued by a suitable umbrella organisation. That umbrella organisation too can have a public key certificate. This can result in a chain of certificates leading to a point (referred to as the root) which the business associate does know. The hierarchical chains of certificates ultimately end with a master organisation at the top of the hierarchical tree which has a self-signed certificate. This means that the public key of the self-signed certificate must be obtained by means outside the public key infrastructure system.

The means by which users can obtain the public key certificates they need, and be sure that those certificates are valid, is known as a public key infrastructure (PKI).

The present invention uses the principles and tools of public key cryptography to control the disclosure time of information.

According to a first aspect of the present invention there is provided a method for controlling the disclosure time of information by a publisher to one or more recipients comprising: a trusted body generating an asymmetrical key pair for a specified date and time of disclosure with an encryption key and a decryption key; the trusted body providing a digital certificate signed with a private key of the trusted body providing the publisher with the encryption key prior to the specified date and time; the publisher using the encryption key to encrypt data; the recipient obtaining the encrypted data, and the trusted body making the decryption key available to the recipient at the specified date and time.

The publisher may verify the signature on the digital certificate with the public key of the trusted body.

Preferably, the encryption key is a public key and the decryption key is a private key in a public key infrastructure.

The trusted body may create an asymmetrical key pair for a specified date and time on demand from a publisher.

In one embodiment, the trusted body may generate one key pair for a specified date and time.

In an alternative embodiment, the trusted body may generate one or more key pairs for a specified date and time, generating a new key pair for each of a plurality of publishers. Each of the one or more publishers may have a password issued by the trusted body for preventing disclosure of the decryption key.

The decryption key may be encrypted with a public key and only recipients with the corresponding private key may obtain the decryption key.

According to a second aspect of the present invention there is provided a system for controlling the disclosure time of information comprising: a publisher, a trusted body; an asymmetrical key pair for a specified date and time of disclosure with an encryption key and a decryption key; a digital certificate signed with a private key of the trusted body providing the publisher with the encryption key prior to the specified date and time; and means for making the decryption key available at the specified date and time.

Preferably, the system includes one or more recipients with means for obtaining data encrypted with the encryption key from the publisher prior to the specified date and time and means for obtaining the decryption key at or after the specified date and time.

The certificate may include the specified date and time, the encryption key value, and the name of the trusted body.

Preferably, the encryption key is a public key and the decryption key is a private key in a public key infrastructure.

In one embodiment, there may be a single key pair for a specified date and time. In an alternative embodiment, there may be a plurality of publishers and one or more key pairs for a specified date and time, a different key pair for each of the plurality of publishers for the specified date and time. Each of the plurality of publishers may have a password issued by the trusted body for preventing disclosure of the decryption key.

The decryption key may be encrypted with a public key and only recipients with the corresponding private key may obtain the decryption key.

The trusted body may have one or more agents who act on behalf of the trusted body. An agent for the trusted body may be a smart card having an internal clock for providing the decryption key to a recipient.

The trusted body may be accessible by the publisher and the recipients via a communication network.

According to a third aspect of the present invention there is provided a computer program product stored on a computer readable storage medium, comprising computer readable program code means for performing the steps of: generating an asymmetrical key pair for a specified date and time of disclosure with an encryption key and a decryption key; providing a digital certificate signed with a private key of the trusted body providing a publisher with the encryption key prior to the specified date and time.

According to a fourth aspect of the present invention there is provided a method for controlling the disclosure time of information by a publisher to one or more recipients comprising: a trusted body generating an asymmetrical key pair for a specified date and time of disclosure with an encryption key and a decryption key; the trusted body providing the publisher with the encryption key prior to the specified date and time; the publisher using the encryption key to encrypt data; the recipient obtaining the encrypted data; and the trusted body making the decryption key available to the recipient at the specified date and time; wherein the trusted body generates one or more key pairs for a specified date and time, generating a new key pair for each of a plurality of publishers.

Each of a plurality of publishers may have a password issued by the trusted body for preventing disclosure of the decryption key for a specified date and time for that publisher.

The decryption key may be encrypted with a public key and only recipients with the corresponding private key may obtain the decryption key.

BRIEF DESCRIPTION OF THE DRAWINGS

Embodiments of the present invention will now be described, by way of examples only, with reference to the accompanying drawings in which.

DETAILED DESCRIPTION OF EMBODIMENTS OF THE INVENTION

Figure 1:
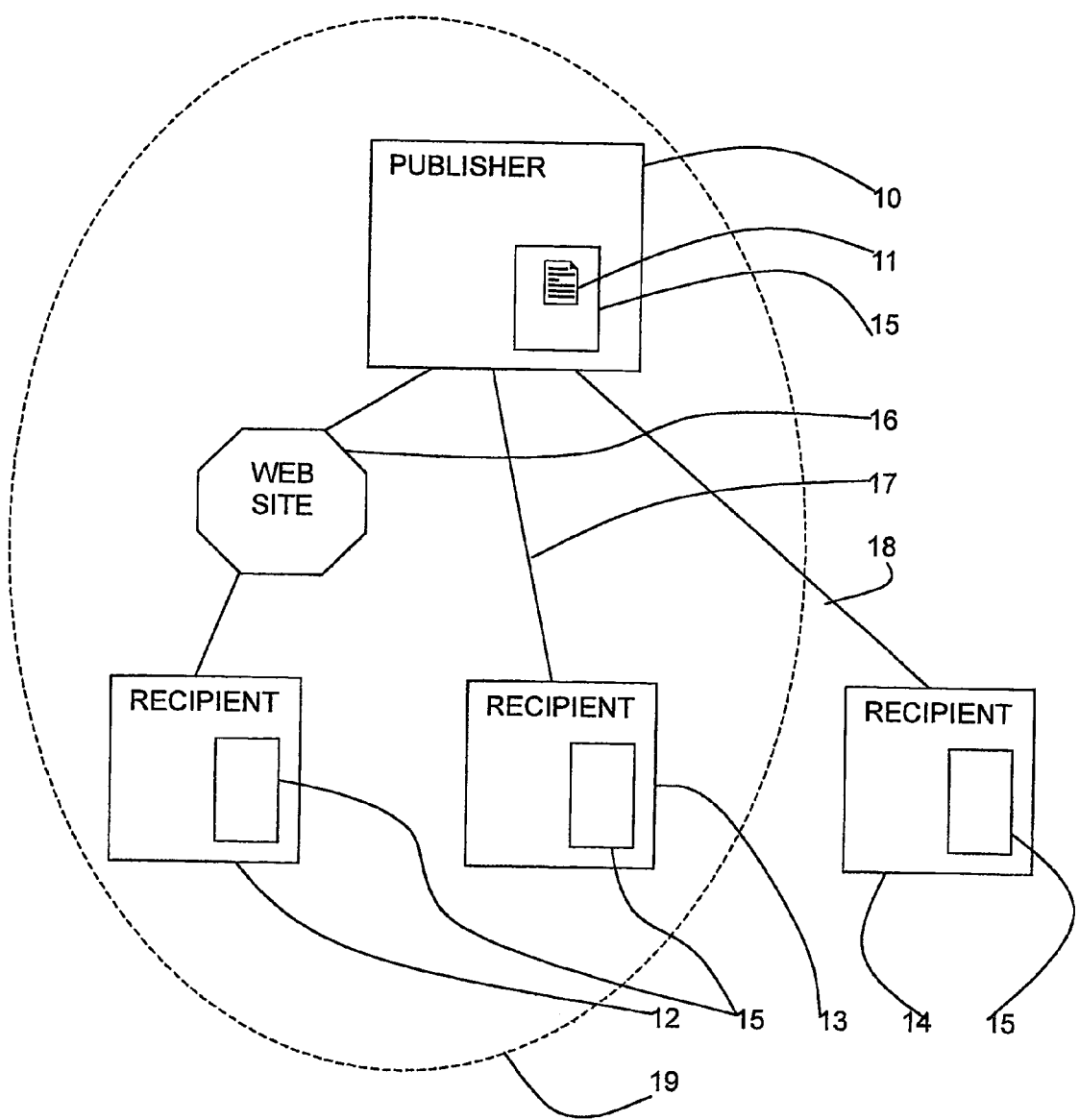
FIG. 1 is a diagram of a system in accordance with the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network, or the connection may be made to an external computer (for example, through the Internet using an Internet Service Provider).

The invention is described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Referring to FIG. 1, there is provided a publisher 10 who wishes to distribute some information 11 to a plurality of recipients 12, 13, 14. The publisher 10 obtains an encryption key and distributes the information 11 in the form of encrypted data 15 to each of the recipients 12, 13, 14.

A first recipient 12 obtains the encrypted data 15 by accessing a web site 16 of the publisher 10 on the Internet and downloading the encrypted data 15 to the recipient's 12 own computer.

A second recipient 13 receives a message 17 by e-mail from the publisher 10 attaching a file of the encrypted data 15.

The first and second recipients 12, 13 are connected to the publisher 10 by a communication network 19 and are therefore part of an online community.

A third recipient 14 is disconnected in that he does not have e-mail or Internet access. The third recipient 14 is sent a CD-ROM 18 by the publisher 10 and the CD-ROM contains the encrypted data 15.

The above recipients 12, 13, 14 are token examples of the plurality of recipients and the encrypted data 15 can be distributed in its electronic form by any available means and via third parties. The recipients 12, 13, 14 receive and store the encrypted data 15 on any suitable electronic device, which may include a computer, a mobile phone, etc.

The encrypted data 15 cannot be accessed or read by the recipients 12, 13, 14 and therefore has not been disclosed to the recipients. At a time controlled by the publisher, a decryption key is made available to the recipients 12, 13, 14. The key enables the recipients 12, 13, 14 to access the information 11.

A trusted service is provided that manages and provides a public key infrastructure service. The trusted service publishes digital certificates for specific dates and times in the future. The digital certificates are certified by the trusted service by a signature using the trusted services private key.

The trusted service is publicly accessible, for example via a web site on the Internet or by e-mail access. The trusted service is itself certified by an umbrella organisation which ratifies the trusted service by providing a certificate of the trusted service's public key. The certificate is signed with the private key of the umbrella organisation. A chain of certificates may be provided with a root of the chain which is bootstrapped or confirmed by a means outside the public key infrastructure.

Figure 2:
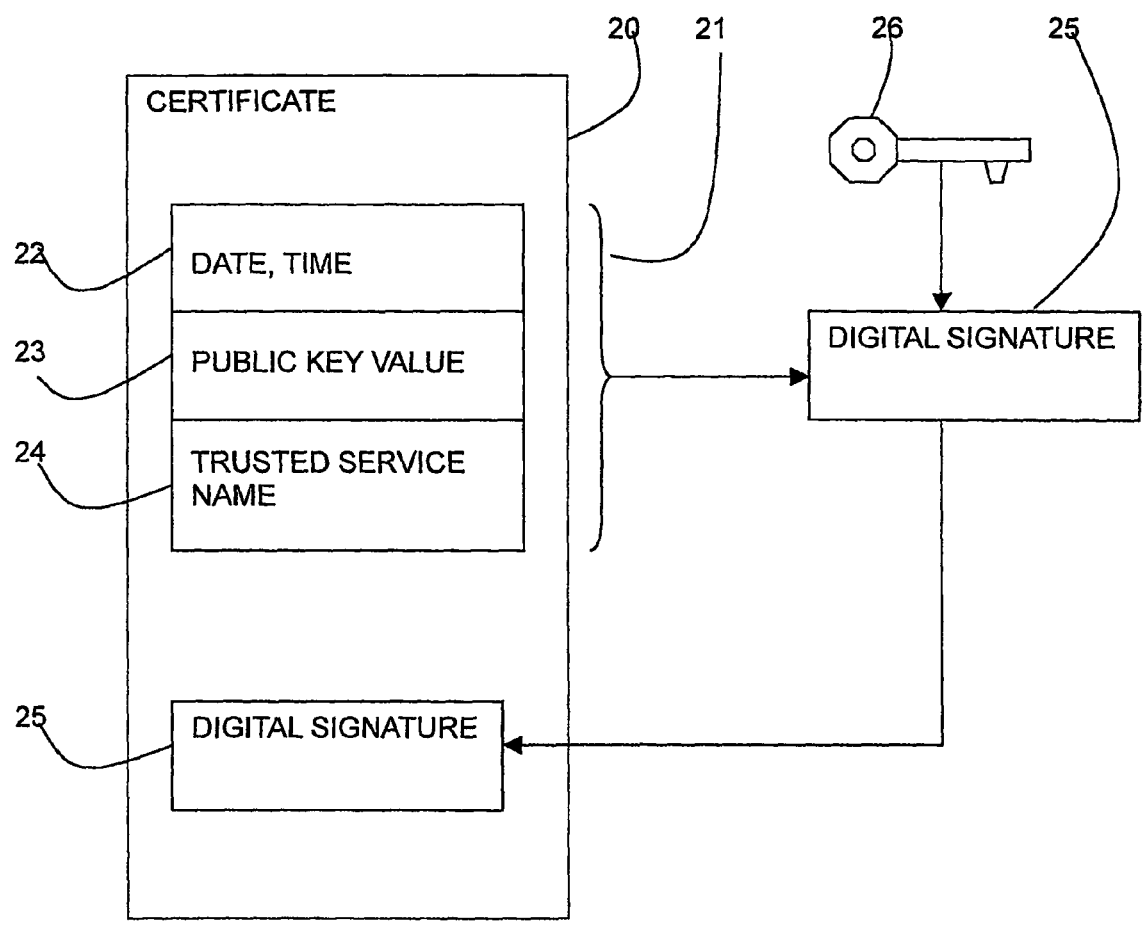
FIG. 2 is a diagram of a certificate for use in accordance with the present invention.

Refering to FIG. 2, a digital certificate 20 is shown. The digital certificate 20 contains certificate information 21. The certificate information 21 includes the subject 22 of the certificate 20 which is the date and time, a public key value 23 for the date and time and the name 24 of the trusted service issuing the certificate. A digital signature 25 is generated using the certificate information 21 by encrypting the certificate information 21 with the private key 26 of the trusted service. The digital signature 25 is inserted in the digital certificate 20.

A publisher wishing to disclose information at a given future date and time approaches the trusted service and requests a public key 23 for the given date and time. For example, a publisher may ask the trusted service for a public key for 22 Apr. 2003 at 10.00 hr. The trusted service will issue a randomly generated certified digital certificate 20 which contains the public key 23.

Providing the public key 23 which is to be used for encryption in the form of a certificate from the trusted service enables the users to trust that the corresponding private key is to be released at the given time. Also, the security provided by a certificate prevents an impostor from posing as a trusted service and issuing a public key and then publishing the private key before time or not at all.

The publisher 10 may now take the information 11 which he wishes to distribute and encrypt it using the public key 23 which has been provided by the trusted service for the date and time of 22 Apr. 2004, 10.00 hr. The encrypted data 15 can then be distributed as discussed in relation to FIG. 1. Recipients 13, 14, 15 who wish to receive the information 11 can then obtain the encrypted data 15 any time before 22 Apr. 2004, 10.00 hr; however, the recipients 13, 14, 15 cannot decrypt the encrypted data 15 as they do not have the private key corresponding to the public key 23.

At the given date and time, in this example 22 Apr. 2004, 10.00 hr, the trusted service makes the private key available. For example, the trusted service may publish the private key on a web site or may provide it by e-mail in response to a request. The recipients can obtain the private key from the trusted service and they can then decrypt the encrypted data 15 and access the information 11.

The trusted service can make the private key available in a digital certificate signed by the trusted service. Before the time of disclosure, the trusted service issues digital certificates 20 as shown in FIG. 2 containing the public key value 23. After the time of disclosure the trusted service can issue the digital certificate with both the public key value 23 and the corresponding private key value.

The trusted service may operate via the Internet and proxies and system caches can be used to reduce the burden on the main site as recipients demand the private key. The private key is relatively small in size and therefore quick to distribute at the given time. In this way, the recipients are all able to access the information 11 very soon after the given date and time ensuring that all recipients have the same ability to access the information 11 promptly after the given time.

Figure 3A:
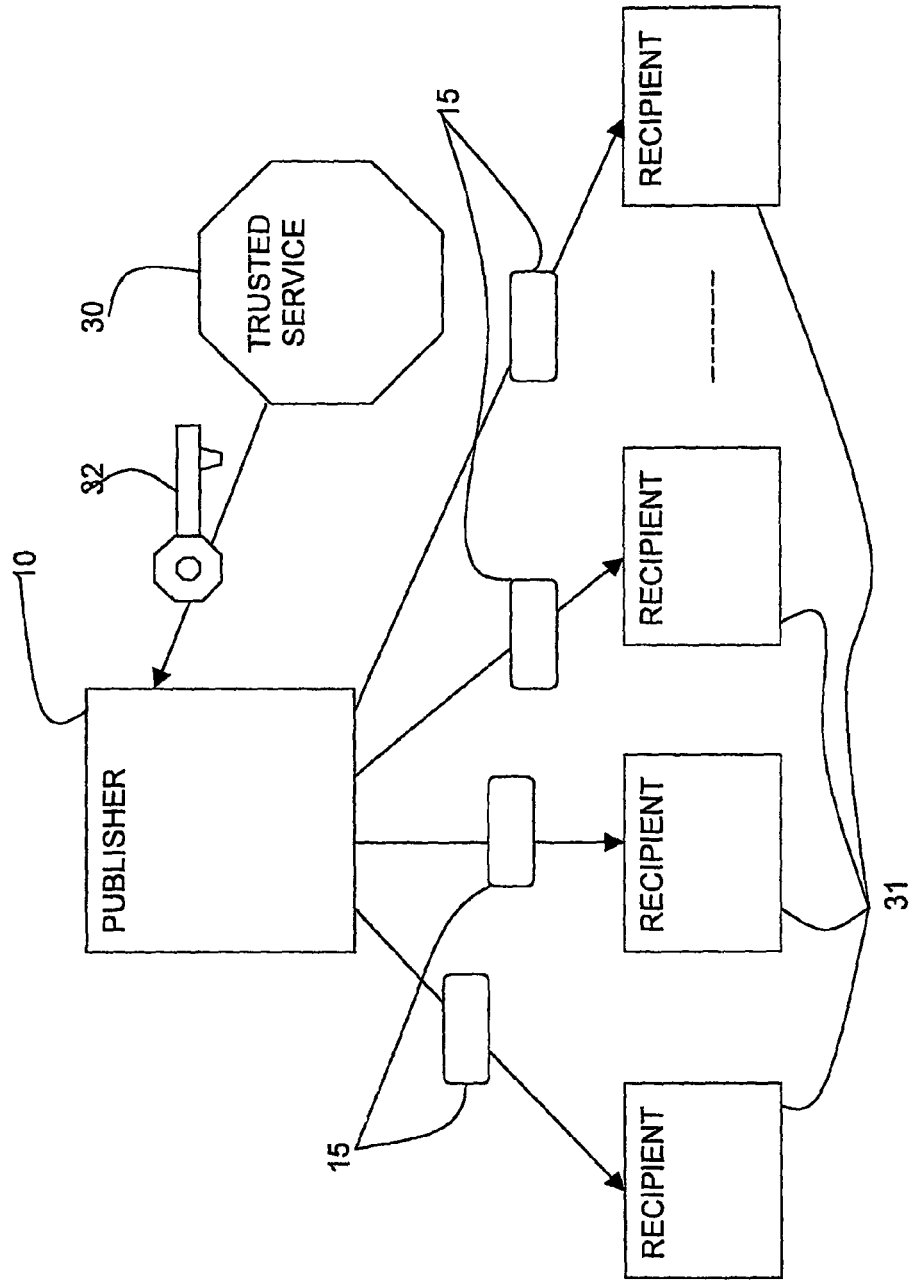
FIG. 3A is a diagram of a system in accordance with the present invention at time T<T1.
Figure 3B:
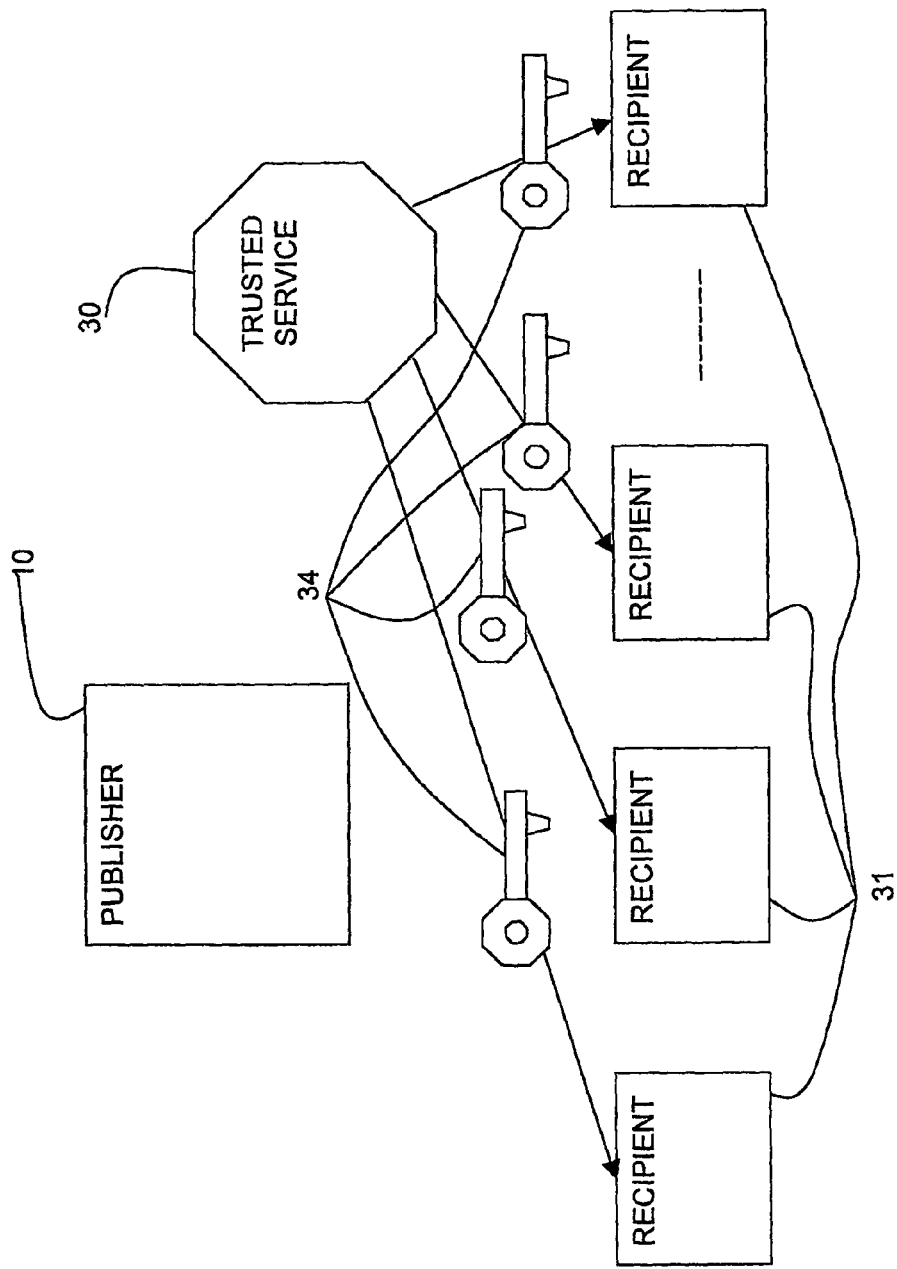
FIG. 3B is a diagram of the system of FIG. 3A at time $T^3 T1$.

FIGS. 3A and 3B show the transfers of the public and private keys between the parties. FIG. 3A is at a time, T, any time before a specific time T1, i.e. T<T1. FIG. 3B is at a time, T, any time at or after the specific time T1, i.e. $T^3 T1$.

In FIGS. 3A and 3B there is shown a publisher 10 and four recipients 31. There is also shown a trusted service 30. In FIG. 3A, the publisher 10 obtains a public key 32 from the trusted service 30 at some time before a specific time, T1. The publisher 10 wants some information to be disclosed to the recipients 31 at the specific time T1. The publisher 10 encrypts the information and the recipients 31 obtain the encrypted information 15 from the publisher 10 at any time once the information has been encrypted. The recipients 31 may obtain the encrypted information 15 at different times.

FIG. 3B shows the same publisher 10 and recipients 31 as in FIG. 3A but after time T1. The recipients 31 each obtain the private key 34 corresponding to the public key 32 of FIG. 3A from the trusted service 30. The recipients 31 can each then decrypt the encrypted information 15 which they obtained prior to time T1.

Figure 4:
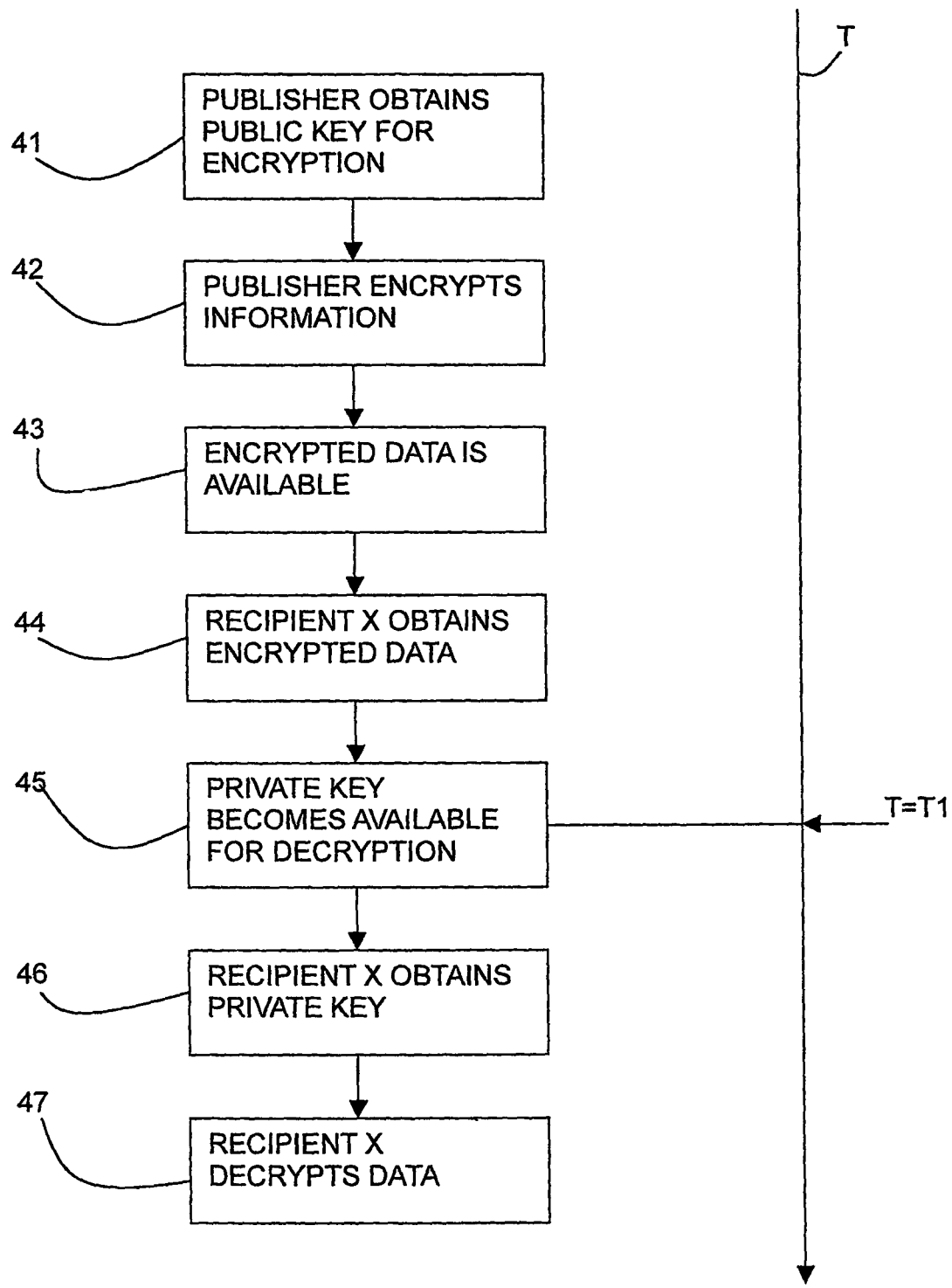
FIG. 4 is a flow diagram of a method in accordance with the present invention.

FIG. 4 is a flow diagram showing the actions of a publisher and a single recipient. FIG. 4 shows time, T, progressing towards the bottom of the page with the specific time T1 shown in relation to the actions. At box 41 a publisher obtains a public key for encrypting some information which the publisher wishes to disclose at or after time T1. The publisher encrypts 42 the information and the encrypted information is made available 43 to recipients. At box 44, a recipient X obtains the encrypted information and stores it, awaiting time T1. At time T1 (see box 45), the private key becomes available for decrypting the encrypted information. At box 46 the recipient X obtains the private key and the recipient X decrypts 47 the information.

For recipients who do not have online access but wish to access the information at the given date and time, the key may be supplied in advance by the trusted service on a time based smart card which would ensure that the private key only becomes available after the specific time. A smart card would be provided with an internal clock and power means, for example a battery. The trusted service would activate the clock and program the card with the private key to be disclosed at a given time. The key would automatically become available on the smart card when the clock reached the given time.

Similarly, the private key could be provided on a data storage means which when inserted into a computer reacts to a computer's internal clock to release the key at the given time. The clock must be a trusted time-keeper or have access to a trusted time server. A trusted time-keeper will sign a digital certificate for a current time.

The trusted service may have one or more agents which are trusted to perform the job of disclosing the private key.

In a first embodiment of the described method and system, the trusted service provides a single key for each date and time. The keys are created on demand. Therefore, when a first publisher requests a key for a specific date and time, T1, the trusted service creates a public/private key pair for that time. If a second publisher also requests a key for time T1, the same key pair is used and the same public key is provided to the second publisher as was provided to the first publisher. In this way, only the exact number of key pairs for the times required is created. No redundant keys are created and stored by the trusted service or its agents thereby reducing overheads.

More than one publisher can safely use the same public key for encryption as the publishers only have the public key and cannot therefore decrypt information encrypted by another publisher using the same public key. The publishers cannot obtain the corresponding private key until it is issued by the trusted service at the specified time.

The table shown below illustrates the private keys as they would be published by the trusted service. One key is provided for each date and time for which a key has been requested.

| DATE, TIME | DECRYPTION KEY (PRIVATE KEY) |
|---|---|
| 22 Apr. 2004, 10.00 | JK6 ... PZ4 |
| 22 Apr. 2004, 16.50 | 7LJ ... 7YT |
| 23 Apr. 2004, 09.00 | JU9 ... W2L |
| 25 Apr. 2004, 14.00 | 5TN ... MNW |

In a second embodiment, the trusted service creates additional keys for each publisher who wishes to publish at a specific time. A first publisher may request a key for date and time T2 and the trusted service creates a key pair and issues the public key to the first publisher. If a second publisher requests a key for the same date and time T2, the trusted service creates a second key pair and issues the public key of the second key pair to the second publisher. At time T2, the trusted service publishes both the private keys of the key pairs created for time T2.

The second embodiment has the advantage that a publisher can stop disclosure of information which has already been distributed in its encrypted form before it is disclosed at time T2. This can be done by the publisher informing the trusted service that the private key is not to be disclosed. As the key pair is unique to a single publisher, the publisher can dictate if the private key is disclosed or not without affecting any other disclosures taking place at the same time. A password can be used for validating the publisher's identity when instructing the trusted service not to publish a private key. The password would be issued to the publisher with the public key in the certificate from the trusted service. Passwords would be securely distributed using the public key infrastructure.

The table shown below illustrates the private keys as they would be published by the trusted service for the second embodiment More than one private key may be provided for each date and time for which a key has been requested with each private key identified by the publisher to which it relates.

| TIME | PUBLISHER | DECRYPTION KEY (PRIVATE KEY) |
|---|---|---|
| 22 Apr. 2004, 10.00 | Publisher P | RT8 ... ZS4 |
| 22 Apr. 2004, 10.00 | Publisher Q | T0R ... BN7 |
| 25 Apr. 2004, 14.00 | Publisher A | 90F ... KK2 |
| 25 Apr. 2004, 14.00 | Publisher B | YC3 ... 6DW |
| 25 Apr. 2004, 14.00 | Publisher C | 8ES ... L4G |
| 26 Apr. 2004, 08.00 | Publisher Z | I60 ... V3M |

In a third embodiment, which may be used in combination with the second embodiment described above, the distribution of the private key is limited to a pre-defined audience. A key pair may be created for time T3 for publisher P and a public key issued to publisher P. The private key is only made available, after time T3, to a pre-defined audience of recipients. This can be achieved by the trusted service encrypting the private key for time T3 with a public key of a key pair. Only the pre-defined audience of recipients will hold the corresponding private key.

For example, IBM employees may all be issued with the same private key for IBM confidential disclosures. If information is to be distributed at time T3 to the employees of IBM but is not to be generally disclosed outside the group of the employees of IBM, the private key for time T3 is encrypted with the public key corresponding to the private key for IBM employees. In this way, the open Internet may be used to transfer information which is confidential to a given group or set of recipients and which is to be disclosed at a given date and time in the future.

Figure 5:
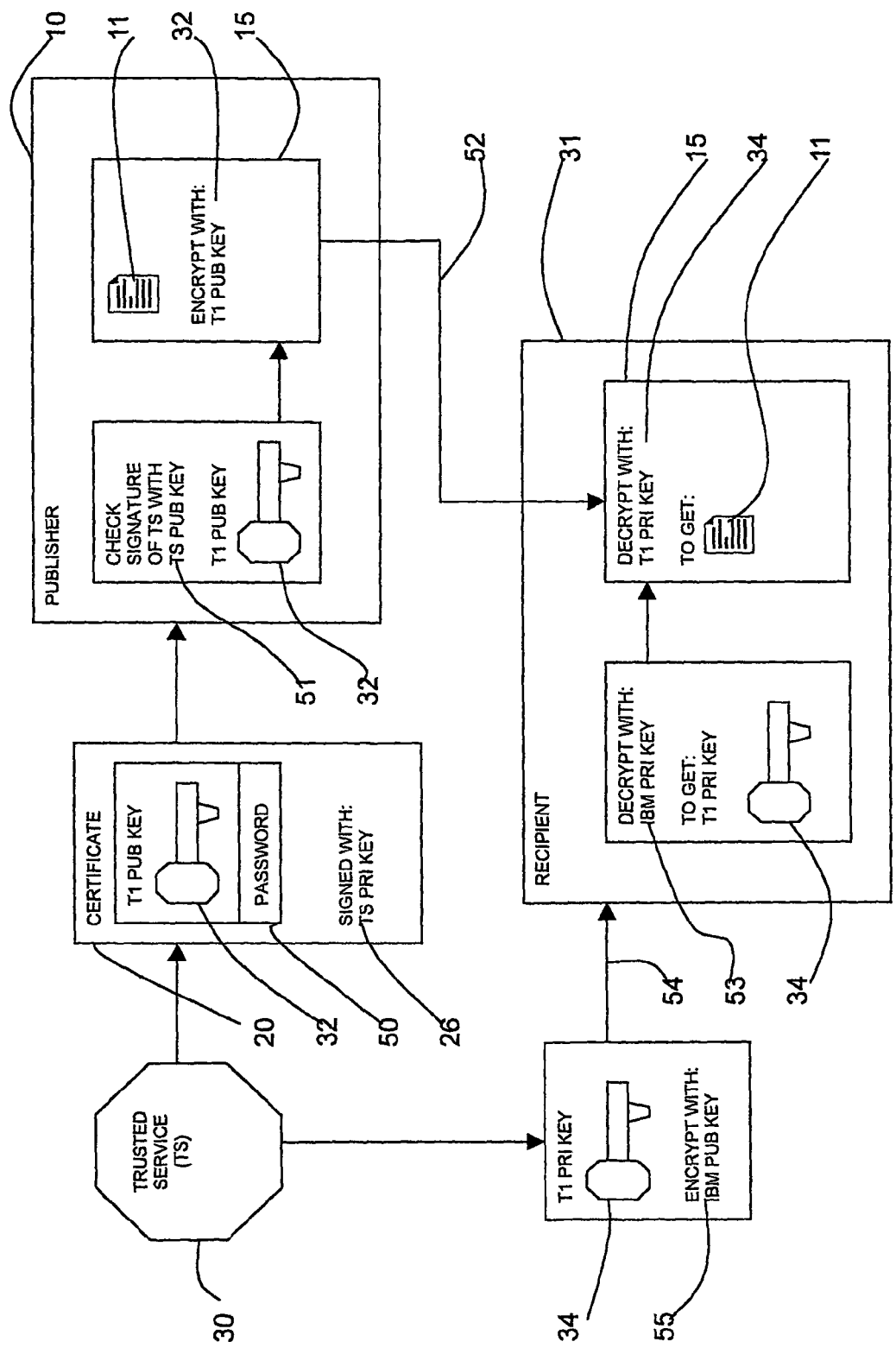
FIG. 5 is a diagram of a system in accordance with an embodiment of the present invention.

FIG. 5 illustrates the third embodiment described above. A publisher 10 wishes to publish a document 11 at time T1. The publisher 10 obtains a T1 public key 32 for time T1 from a trusted service 30. The trusted service 30 sends the publisher 10 a certificate 20 which contains the T1 public key 32. The certificate 20 is signed with the trusted service's private key 26. The certificate 20 may also contain a password 50 for the publisher 10 to use if the publisher 10 wishes to withdraw the publication before time T1.

The publisher 10 optionally checks the signature of the trusted service 30 by using the trusted service's public key 51. The publisher 10 encrypts the document 11 with the T1 public key 32 resulting in an encrypted document 15.

A recipient 31 obtains 52 the encrypted document 15 from the publisher 10. The recipient 31 in this example is one of a group of IBM authorised personnel who has an IBM private key 53. The IBM authorised personnel are a group who are authorised to have access to a particular category of information and documents which includes document 11.

After time T1, the recipient 31 obtains 54 the T1 private key 34 from the trusted service 30. The T1 private key 34 is encrypted with the IBM public key 55 which corresponds to the IBM private key 53. The encrypted T1 private key 34 may optionally be provided in a certificate from the trusted service 30.

The recipient 31 decrypts the T1 private key 34 using the IBM private key 53. The recipient 31 can then decrypt the encrypted document 15 using the T1 private key 34 to access the document 11.

In this way, a document can be distributed to a selected group of recipients ahead of its disclosure at a specified date and time. The distribution can be made via the public Internet or by other online or offline means at a time to suit each of the recipients. As the publisher has a password associated with the public key used for encryption, the publisher can withdraw the disclosure of the information before the disclosure date even after the encrypted information has been received by the recipients.

For the implementation of the system by the recipients, a client application is required to obtain, decrypt and launch media This may be in the form of a plug-in or client side application.

The disclosed system has numerous uses in which the disclosure of information is time sensitive including software update issues, corporate publications, government/press releases to agencies, music releases to radio stations, Dutch auctions, film distribution, etc.

The concept of a trusted time-keeper introduced herein can also be used as a means of providing proof of ownership of a document at a given time. A trusted time-keeper can sign the document with the current time which is certified by the time-keeper.

Aspects of the present invention are typically implemented as computer program products, comprising a set of program instructions for controlling a computer of similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

The invention claimed is:

1. A method for controlling a disclosure time of information by a publisher to one or more recipients comprising:
    a trusted body generating an asymmetrical key pair for a specified date and time of disclosure with an encryption key and a decryption key;
    the trusted body providing a digital certificate signed with a private key of the trusted body to the publisher prior to the specified date and time, the digital certificate providing the publisher with the encryption key prior to the specified date and time;
    the publisher using the encryption key to encrypt data;
    the recipient obtaining the encrypted data; and
    the trusted body making the decryption key available to the recipient at the specified date and time, wherein the trusted body generates one or more asymmeytrical key pairs for the specified date and time, generating a new asymmetrical key pair for each of a plurality of publishers, and each of the plurality of publishers has a password issued by the trusted body for preventing disclosure of the decryption key.

2. The method of claim 1, wherein the publisher verifies the signature on the digital certificate with the public key of the trusted body.

3. The method of claim 1, wherein the encryption key is a public key and the decryption key is another private key in a public key infrastructure.

4. The method of claim 1, wherein the trusted body creates the asymmetrical key pair for the specified date and time on demand from the publisher.

5. The method of claim 1, wherein the trusted body generates one key pair for the specified date and time.

6. The method of claim 1, wherein the decryption key is encrypted with a public key and only recipients with the corresponding private key can obtain the decryption key.

7. A computer program product comprising a non-transitory computer readable medium directly loadable onto the internal memory of a digital computer, comprising software code portions for performing the steps of claim 1 when said product is run on the digital computer.

8. A system for controlling a disclosure time of information comprising:
    a publisher;
    a trusted body;
    an asymmetrical key pair for a specified date and time of disclosure with an encryption key and a decryption key;
    a digital certificate signed with a private key of the trusted body, the digital certificate providing the publisher with the encryption key prior to the specified date and time; and
    means for making the decryption key available at the specified date and time, wherein there is a plurality of publishers, one or more asymmetrical key pairs for the specified date and time, a different asymmetrical key pair for each of the plurality of publishers, and each of the plurality of publishers has a password issued by the trusted body for preventing disclosure of the decryption key.

9. The system of claim 8, including one or more recipients with means for obtaining data encrypted with the encryption key from the publisher prior to the specified date and time and means for obtaining the decryption key at or after the specified date and time.

10. The system of claim 9, wherein the trusted body is accessible by the publisher and the recipients via a communication network.

11. The system of claim 8, wherein the certificate includes the specified date and time, the encryption key, and a name of the trusted body.

12. The system of claim 8, wherein the encryption key is a public key and the decryption key is another private key in a public key infrastructure.

13. The system of claim 8, wherein the decryption key is encrypted with a public key and only recipients with a corresponding private key can obtain the decryption key.

14. The system of claim 8, wherein the trusted body has one or more agents who act on behalf of the trusted body.

15. The system of claim 8, wherein an agent for the trusted body is a smart card having an internal clock for providing the decryption key to a recipient.

16. A method for controlling a disclosure time of information by a publisher to one or more recipients comprising:
    a trusted body generating an asymmetrical key pair for a specified date and time of disclosure with an encryption key and a decryption key;
    the trusted body providing the publisher with the encryption key prior to the specified date and time;
    the publisher using the encryption key to encrypt data;
    the recipient obtaining the encrypted data; and
    the trusted body making the decryption key available to the recipient at the specified date and time;
    wherein the trusted body generates one or more asymmetrical key pairs for the specified date and time, generating a new asymmetrical key pair for each of a plurality of publishers, wherein each of the plurality of publishers has a password issued by the trusted body for preventing disclosure of the decryption key.

17. The method of claim 16, wherein the decryption key is encrypted with a public key and only the recipient with a corresponding private key can obtain the decryption key.

18. An information distributing service for controlling a disclosure time of information by a publisher to one or more recipients comprising:
    a trusted body generating an asymmetrical key pair for a specified date and time of disclosure with an encryption key and a decryption key;
    the trusted body providing a digital certificate signed with a private key of the trusted body, the digital certificate providing the publisher with the encryption key prior to the specified date and time;
    the publisher using the encryption key to encrypt data;
    the recipient obtaining the encrypted data; and
    the trusted body making the decryption key available to the recipient at the specified date and time, wherein the trusted body is configured to generate one or more asymmetrical key pairs for the specified date and time, generating a new asymmetrical key pair for each of a plurality of publishers, and each of the plurality of publishers has a password issued by the trusted body for preventing disclosure of the decryption key.

* * * * *